(12) United States Patent
McCoy

(10) Patent No.: US 10,443,590 B1
(45) Date of Patent: Oct. 15, 2019

(54) GAS COMPRESSOR COMPRESSING WELL HEAD CASING GAS

(71) Applicant: Charles David McCoy, Midland, TX (US)

(72) Inventor: Charles David McCoy, Midland, TX (US)

( * ) Notice: Subject to any disclaimer, the term of this patent is extended or adjusted under 35 U.S.C. 154(b) by 67 days.

(21) Appl. No.: 15/384,977

(22) Filed: Dec. 20, 2016

Related U.S. Application Data

(63) Continuation-in-part of application No. 14/446,924, filed on Jul. 30, 2014, now abandoned, which is a
(Continued)

(51) Int. Cl.
F04B 27/00 (2006.01)
F04B 35/01 (2006.01)
(Continued)

(52) U.S. Cl.
CPC ............ F04B 27/005 (2013.01); F04B 9/113 (2013.01); F04B 35/01 (2013.01); F04B 39/0022 (2013.01); F04B 39/12 (2013.01); F04B 39/125 (2013.01); F15B 15/1461 (2013.01); F16J 15/16 (2013.01); F16J 15/32 (2013.01)

(58) Field of Classification Search
CPC ........................ F04B 9/113; F04B 35/01; F04B 49/03; F04B 49/22; F04B 9/129; F04B 9/131; F04B 9/133; F04B 9/137; F04B 9/1372; F04B 53/144; F04B 53/164; F04B 9/08; F04B 9/10; F04B 9/109; F04B 9/1095; F04B 9/111; F04B 39/12; F04B 39/125; F04B 39/121; F04B 39/122; F04B 27/005; F04B 39/01; F15B 15/1442; F15B 15/1461; F16J 15/16; F16J 15/32; F16J 15/56

See application file for complete search history.

(56) References Cited

U.S. PATENT DOCUMENTS 3,216,651 A * 11/1965 King ...................... F16J 15/008
277/558
3,234,746 A 2/1966 Cope
(Continued)

FOREIGN PATENT DOCUMENTS

GB 2091816 A 8/1982

Primary Examiner — Bryan Lettman
(74) Attorney, Agent, or Firm — Buskop Law Group, P.C.; Wendy Buskop

(57) ABSTRACT

A gas compressor with a drive power section engaging, through a seal assembly, a dual activating compressor section. The drive power section has a hydraulic drive cylinder, an upper hydraulic drive chamber, a lower hydraulic drive chamber, and a hydraulic drive piston. The dual activating compressor section has a compressor cylinder with an upper compression chamber and a lower compression chamber separated by a compressor piston, a first piston locator sensor, and a second piston locator sensor. The drive power section receives a hydraulic drive fluid and discharges spent hydraulic drive fluid. The dual activating compressor section is configured for receiving a source vapor or gas and discharging compressed vapors while the drive power section operates. The drive power section is movable between a first orientation and a second orientation.

16 Claims, 6 Drawing Sheets

Related U.S. Application Data continuation-in-part of application No. PCT/US2013/042203, filed on May 22, 2013.

(60) Provisional application No. 61/688,852, filed on May 22, 2012.

(51) Int. Cl.
| | |
|---|---|
| *F04B 39/00* | (2006.01) |
| *F04B 39/12* | (2006.01) |
| *F15B 15/14* | (2006.01) |
| *F16J 15/16* | (2006.01) |
| *F16J 15/32* | (2016.01) |
| *F04B 9/113* | (2006.01) |

(56) References Cited

U.S. PATENT DOCUMENTS

| | | | |
|---|---|---|---|
| 4,406,122 A | 9/1983 | McDuffie | |
| 4,653,986 A | 3/1987 | Ashton | |
| 5,110,267 A * | 5/1992 | Giordani | F04B 9/113 417/404 |
| 5,281,100 A | 1/1994 | Diedrich | |
| 5,411,374 A | 5/1995 | Gram | |
| 6,206,658 B1 * | 3/2001 | Nishioka | B01J 3/006 210/603 |
| 6,357,235 B1 * | 3/2002 | Cerro | F01K 19/02 60/645 |
| 2002/0153665 A1 * | 10/2002 | Borstel | F16J 15/164 277/560 |
| 2002/0182281 A1 * | 12/2002 | Minemoto | B22C 9/065 425/86 |

* cited by examiner

GAS COMPRESSOR COMPRESSING WELL HEAD CASING GAS

CROSS REFERENCE TO RELATED APPLICATIONS

The present application is a Continuation in Part of U.S. patent application Ser. No. 14/446,924 filed on Jul. 30, 2014, which is a Continuation in Part of International Application Serial No. PCT/2013/042203 filed on May 22, 2013, which both are entitled "GAS COMPRESSOR," which claims priority to U.S. Provisional Patent Application Ser. No. 61/688,852 filed on May 22, 2012, entitled "Hydraulic Beam Gas Compressor." These applications are incorporated in their entirety.

FIELD

The present embodiments generally relate to a gas compressor. The gas compressor can be driven hydraulically, electrically, mechanically with a rack and pinion system, mechanical with a crank arm, or the like.

BACKGROUND

A need exists for a gas compressor that compresses well head casing gas utilizing fluid from a hydraulic fluid system and/or hydraulic lift pumping unit or mechanically with a rack and pinion system, mechanically with a crank arm, or the like.

A need exists for a gas compressor that can capture methane and other gases from a variety of locations like, offshore oil wells, stock tanks, oil tank batteries, dairy farms, waste dumps, or other locations that generate gasses needing to be compressed.

A need exists for a gas compressor that can evacuate gas from the casing of an oil and/or gas well and discharge it into a higher pressure flow or sales line utilizing the prime mover motor from an existing hydraulic fluid system, fluid from an existing hydraulic lift pumping unit system, or the like.

The present embodiments meet these needs.

BRIEF DESCRIPTION OF THE DRAWINGS

The detailed description will be better understood in conjunction with the accompanying drawings as follows.

Figure 1:
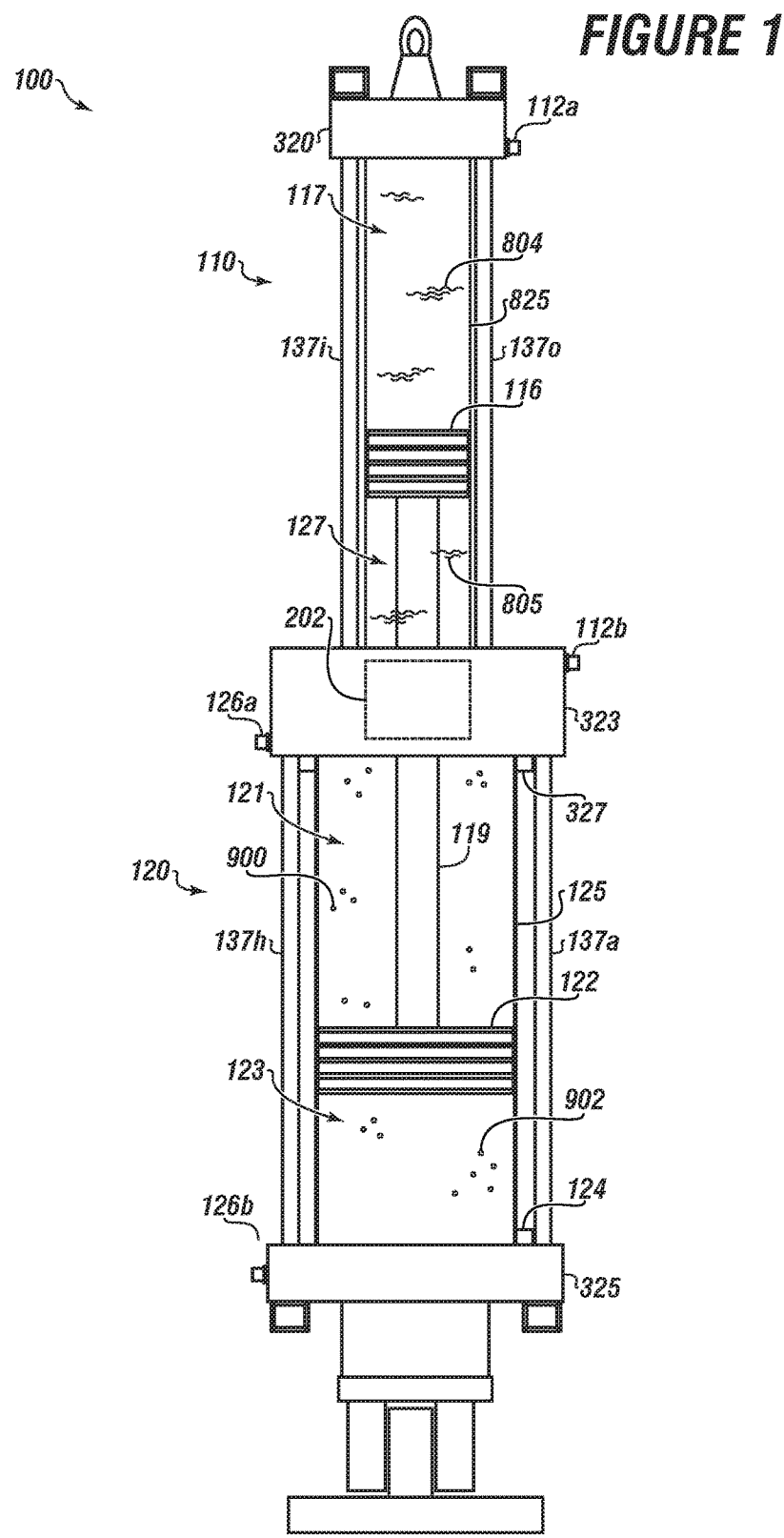
FIG. 1 depicts a front view of gas compressor in a first orientation according to one or more embodiments.

The present embodiments are detailed below with reference to the listed Figures.

DETAILED DESCRIPTION OF THE EMBODIMENTS

Before explaining the present system in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The invention generally relates to a gas compressor.

The gas compressor increases safety at a site by providing a self-contained unit that prevents hydrogen sulfide from exiting the compressor and killing hands nearby the compressor, such as in an oil field.

The gas compressor prevents toxic spills by providing a dual sealing system around a common rod in a compressor that provides a dual acting compressor cylinder.

The embodiments do not emit any vapors and are completely contained and is environmentally compliant to 2016 EPA regulations in the United States.

In embodiments, the compression ratios of the invention are better than commercially available compressors. The embodiments provide a single phase compressor with 10 ratios of compression better than identical sized single phased compressor currently available.

The embodiments gather and compress natural gas and/or hydrocarbon vapors from sources associated with the production of oil and gas production.

The embodiments can compress hydrocarbon gas into a gas pipe line.

The embodiments endure highly destructive and corrosive natural gas vapors.

A gas compressor can have a drive power section for receiving a pressurized hydraulic drive fluid and discharging spent hydraulic drive fluid. The drive power section can engage, through a seal assembly, a dual activating compressor section.

The dual activating compressor section can be configured for receiving a source of vapor or gas and discharging compressed vapors using a common rod while the drive power section operates. The drive power section can be movable between a first orientation and a second orientation.

The drive power section comprising can have a hydraulic drive cylinder having a hydraulic drive cylinder stroke Y.

The hydraulic drive cylinder can have an upper hydraulic drive chamber, a lower hydraulic drive chamber, a hydraulic drive piston movably positioned between the upper hydraulic drive chamber and the lower hydraulic drive chamber.

The upper hydraulic drive chamber can be adapted to receive pressurized hydraulic drive fluid and simultaneously discharge spent hydraulic drive fluid from the lower hydraulic drive chamber to a reservoir when positioned in the first orientation.

The dual activating compressor section can have a compressor cylinder with an upper compression chamber and a lower compression chamber separated by a compressor piston.

The compressor cylinder can have a compressor cylinder stroke X identical to the hydraulic drive cylinder stroke Y. In embodiments, the compressor cylinder and the hydraulic drive cylinder have a variable stroke that is adjustable to volumes of gas, line pressure strokes per minute and source pressure.

The compressor piston can be connected to the common rod.

The upper compression chamber can be configured to receive the source of vapor or gas at source pressure while simultaneously the lower compression chamber discharges compressed vapors at line pressure.

A first piston locator sensor can be positioned adjacent the compressor cylinder for detection the compression piston at a first end of a stroke.

A second piston locator sensor can be positioned adjacent the compressor cylinder for detection of the compression piston at a second end of the stroke.

When the compressor piston is in a first orientation, pressurized hydraulic drive fluid flows into the lower hydraulic drive chamber while simultaneously spent hydraulic fluid is discharged causing the compressor piston to move towards a second orientation while simultaneously causing source of vapor or gas to enter the lower compression chamber and simultaneously discharge compressed vapors at line pressure from the upper compression chamber.

Further, when the compression piston arrives at the first piston locator sensor, the first piston locator sensor transmits a signal to a controller causing transmission of pressurized hydraulic drive fluid into the upper hydraulic drive chamber while simultaneously causing discharge of spent hydraulic fluid from the lower hydraulic drive chamber moving the compression piston towards the second piston locator sensor while flowing source vapors into the upper compression chamber and discharge of compressed vapors at line pressure from the lower compression chamber moving the compressor piston from the first orientation to the second orientation.

The second piston locator sensor detects the compressor piston and reverses the process. The compressor enables two pistons, one in the hydraulic drive cylinder and one in the compressor cylinder, to move in tandem using the common rod for recovery of at least one of vapors and gas.

The gas compressor can use a dual acting compressor to evacuate gas from the casing of an oil and/or gas well and can simultaneously discharge the gas to a flow line or sales system.

The gas compressor can be driven hydraulically, electrically, mechanically with a rack and pinion system, mechanically with a crank arm, or the like.

The gas compressor can be driven using a crank arm and a gear box. A variable frequency drive can be used in conjunction with the crank arm to control the strokes per minute or the drive can be a simple start stop drive.

A rack and pinion system can be used to drive the gas compressor. The rack and pinion system can include a gear box including a reverse gear, which shifts at the end of the stroke. In other embodiments, a gear box with a shaft that extends through a housing can be used. The shaft can be operatively engaged with a first motor on one side of the gear box and a second motor on the other side of the housing. The motors can be cooperatively used in conjunction with one another, wherein one motor sends the compressor piston up and the other sends the compressor piston down.

In one or more embodiments, the gas compressor can be driven hydraulically. The hydraulic drive can transfer energy from a hydraulic fluid system (HFS) into a means that the gas compressor can use to compress gas in a dual activating compressor section. Accordingly, the HFS provides the means for moving the compressor piston and rod assembly in the drive power section. The HFS can be a commercially available HFS.

In embodiments, the gas compressor can make use of an existing HFS being used in conjunction with equipment in the same locality. In many situations, the HFS has excess capacity that is not being utilized.

In these applications, the gas compressor can use little to no energy in addition to that already supplied to the HFS. By making use of an existing HFS, the gas compressor can add significant value to a user system by generating saleable product discharged into a sales line or high pressure flow with little to no cost to the user.

Further, the larger compression chamber of the present invention can reduce the necessary cycles for the compression of gasses. This in turn allows for a significantly improved efficiency during the operation as well as a reduced energy requirement. The gas compressor disclosed herein can operate at less than 10 cycles per minute as opposed to the current art operating at 1500 cycles or more per minute.

The novel design and cooperative application of the gas compressor can result in significant economic benefits to a user with minimal cost or additional necessary equipment.

A hydraulic pumping unit (HLPU) can provide the means for moving fluid from the tubing of a natural gas or oil well. The HLPU can be any commercially available HLPU. The HLPU can be connected to use the energy in the fluid from the HFS or the prime mover of the HFS to actuate its own pump.

The gas compressor can be connected via hydraulic hoses to the drive power section with the hydraulic fluid system being used.

The gas compressor can be used as a vapor extraction unit to remove vapor from a storage tank battery system or methane capture system in a land fill or similar systems. Almost anywhere vapor or gas is created can be captured with this unit.

The gas compressor can be used in conjunction with a rod pumping unit to lower back pressure in the casing. The gas compressor can be used to drive natural gas to other gas operated equipment, like a rod pumping unit or electric generators.

The gas compressor can be made from materials that are capable of withstanding high temperatures. Accordingly, the gas compressor can be used in high temperature operations. The high temperatures can be due to high compression ratios because temperature is controlled by the ideal gas law.

Turning now to the Figures, FIG. 1 depicts a front view of a gas compressor with a location of the hydraulic drive piston 116 in a first orientation.

The gas compressor 100 can include a drive power section 110 for receiving a pressurized hydraulic drive fluid 804 and discharging non-pressurized spent hydraulic drive fluid 805.

The drive power section 110 can engage, through a seal assembly 202, a dual activating compressor section 120. The dual activating compressor section 120 can be configured for receiving a source vapor or gas 900 and discharging compressed vapors 902 using a common rod 119 while the drive power section operates.

In embodiments, the drive power section 110 can have a hydraulic drive piston 116 that is movable between a first orientation and a second orientation.

The drive power section 110 can have a hydraulic drive cylinder 825 having a hydraulic drive cylinder stroke Y. The stroke is not depicted in the Figure.

The hydraulic drive cylinder can have an upper hydraulic drive chamber 117, a lower hydraulic drive chamber 127, with the hydraulic drive piston 116 separating the chambers.

In embodiments, the hydraulic drive piston can be made from a metal that is corrosion resistant and impact resistant.

In embodiments, the gas compressor can support hydraulic pressure from 100 psi to 2000 psi.

A first drive port 112a can be installed on a hydraulic upper head 320. The first drive port can be in fluid communication with the upper hydraulic drive chamber 117.

In embodiments, the first drive port 112a can be configured to sequentially receive and exhaust pressurized hydraulic drive fluid 804.

A second drive port 112b can be installed on a common head 323. The second drive port can be in fluid communication with the lower hydraulic drive chamber 127.

In embodiments, the second drive port 112b can be configured to sequentially receive and exhaust the non-pressurized spent hydraulic drive fluid 805.

The dual activating compressor section 120 is connected to the drive power section 110 with the common head 323 through which is installed the common rod 119.

In embodiments, the common rod 119 can have a length from 12 inches to 200 inches.

In embodiments, the common rod 119 can have a diameter from 1 inch to 3 inches.

In embodiments, the common rod can be solid and made from steel.

The dual activating compressor section 120 can include a compressor cylinder 125 with an upper compression chamber 121 and a lower compression chamber 123 separated by a compressor piston 122 that is connected to the common rod 119.

The compressor cylinder 125 can have a compressor cylinder stroke X identical to the hydraulic drive cylinder stroke Y.

The upper compression chamber 121 can be configured receive the source vapor or gas 900 at source pressure while simultaneously the lower compression chamber 123 discharges compressed vapors 902 at line pressure.

In embodiments, the source vapor or gas 900 that is suctioned into the compressor cylinder 125 can be a producing wellhead such as a natural gas well or a hydrocarbon storage facility.

The term "source pressure" as used herein can refer to the system suction pressure.

The term "line pressure" as used herein can refer to the system discharge pressure.

The dual activating compressor section 120 can have a first piston locator sensor 327 positioned near the common head 323. The first piston locator sensor 327 can be positioned adjacent the compressor cylinder 125 for detection of the compressor piston 122 at a first end of a stroke.

The first piston locator sensor 327 can be in communication with a controller shown in later Figures. The first piston locator sensor can be a magnetic sensor, or a pressure sensor.

The dual activating compressor section 120 can have a second piston locator sensor 124. The second piston locator sensor 124 can be positioned adjacent the compressor cylinder 125 proximate to a compressor lower head 325 positioned opposite the common head 323 for detection of the compression piston 122 at a second end of the stroke of the compressor piston 122.

The second piston locator sensor 124 can be in communication with the controller (identified as element 530) shown in later Figures. The second piston locator sensor 124 can be a magnetic sensor, or a pressure sensor.

In embodiments, a plurality of tie rods 137a-137h can be connected in parallel and mounted between the common head 323 and the compressor lower head 325, and disposed around the compressor cylinder 125.

The tie rods 137i-137o engage between a hydraulic upper head 320 and the common head 323 around the outer surface of the hydraulic drive cylinder 825.

Each tie rod 137i-137o can be a solid cylinder secured with bolts.

In embodiments, each tie rod 137i-137o can have a length equivalent to either the hydraulic drive cylinder or the compressor cylinder that the tie rods are encircling.

Each tie rod 137i-137o can have a diameter ranging from 0.5 inch to 2 inches.

Each tie rod 137i-137o can be made from steel or other durable metal.

In embodiments, a first bidirectional compressor port 126a can be formed in the common head 323.

A second bidirectional compressor port 126b is formed in the compressor lower head 325.

The first bidirectional compressor port 126a can be configured to sequentially receive source vapor or gas 900 and exhaust compressed vapors 902.

The second bidirectional compressor port 126b can be configured to sequentially receive source vapor or gas 900 and exhaust compressed vapors 902 through a discharge port shown in other Figures.

In embodiments, when the compressor piston 122 is in a first orientation pressurized hydraulic drive fluid 804 flows into the lower hydraulic drive chamber 127 while simultaneously non-pressurized spent hydraulic drive fluid 805 is discharged causing the compressor piston 122 to move towards a second orientation while simultaneously causing a source vapor or gas 900 to enter the lower compression chamber 123 and simultaneously discharge compressed vapors 902 at line pressure from the upper compression chamber 121.

When the compressor piston 122 arrives at the first piston locator sensor 327, the first piston locator sensor 327 transmits a signal to a controller (shown in FIG. 4) causing transmission of pressurized hydraulic drive fluid 804 into the upper hydraulic drive chamber 117 while simultaneously causing discharge of non-pressurized spent hydraulic drive fluid 805 from the lower hydraulic drive chamber 127 moving the compression piston 122 towards a second piston locator sensor 124 while flowing source vapor or gas 900 into the upper compression chamber 121 and discharge of compressed vapors 902 at line pressure from the lower compression chamber 123 moving the compressor piston 122 from the second orientation to the first orientation.

The compressor 100 enables hydraulic drive piston and compressor piston, one in the hydraulic drive cylinder 825 and one in the compressor cylinder 125 respectively, to move in tandem using the common rod 119 for recovery of at least one of vapor and gas.

Figure 2:
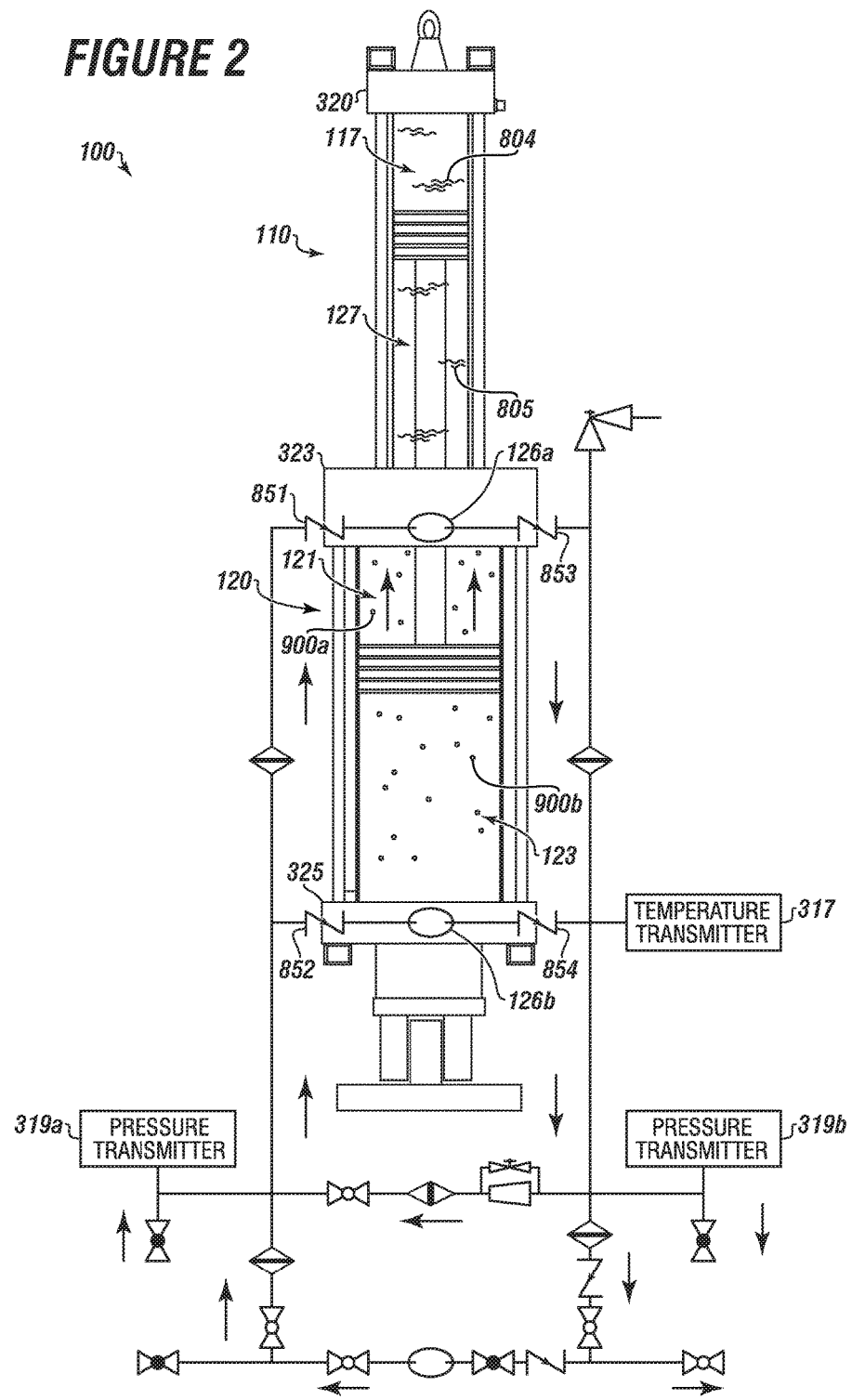
FIG. 2 depicts the gas compressor in second orientation according to one or more embodiments.

FIG. 2 depicts a schematic of the gas compressor the hydraulic drive piston in a second orientation wherein the hydraulic drive piston and compressor piston connected to the common rod have moved.

The gas compressor 100 can have a dual activating compressor section 120 with a common head 323.

The common head 323 can have the first bidirectional compressor port 126a.

The common head 323 can support an upper manifold with a first check valve 851 on the suction end of the upper manifold a third check valve 853 on the discharge side of the upper manifold.

The dual activating compressor section 120 can have a compressor lower head 325 with lower manifold.

The lower manifold can have second check valve 852 on the suction end of the lower manifold and a fourth check valve 854 on the discharge end of the lower manifold.

One or more temperature transmitters, such as temperature transmitter 317, and one or more pressure transmitters, such as pressure transmitters 319a and 319b can be used to regulate vapor flow and each transmitter is in communication with the controller to regulate the gas compressor 100.

In embodiments, the upper hydraulic drive chamber 117 in the drive power section 110 can contain pressurized hydraulic drive fluid 804 and the lower hydraulic drive chamber 127 contains the non-pressurized spent hydraulic drive fluid 805.

The hydraulic drive piston and compressor piston can move towards the hydraulic upper head 320 and show in the upper compression chamber 121 that source vapor or gas 900a is being compressed. At the same time, in the lower compression chamber 123, source vapor or gas 900b can be drawn through the second bidirectional compressor port 126b and through the second check valve 852 into the lower compression chamber 123.

The fourth check valve 854 can be closed during this piston movement.

Figure 3:
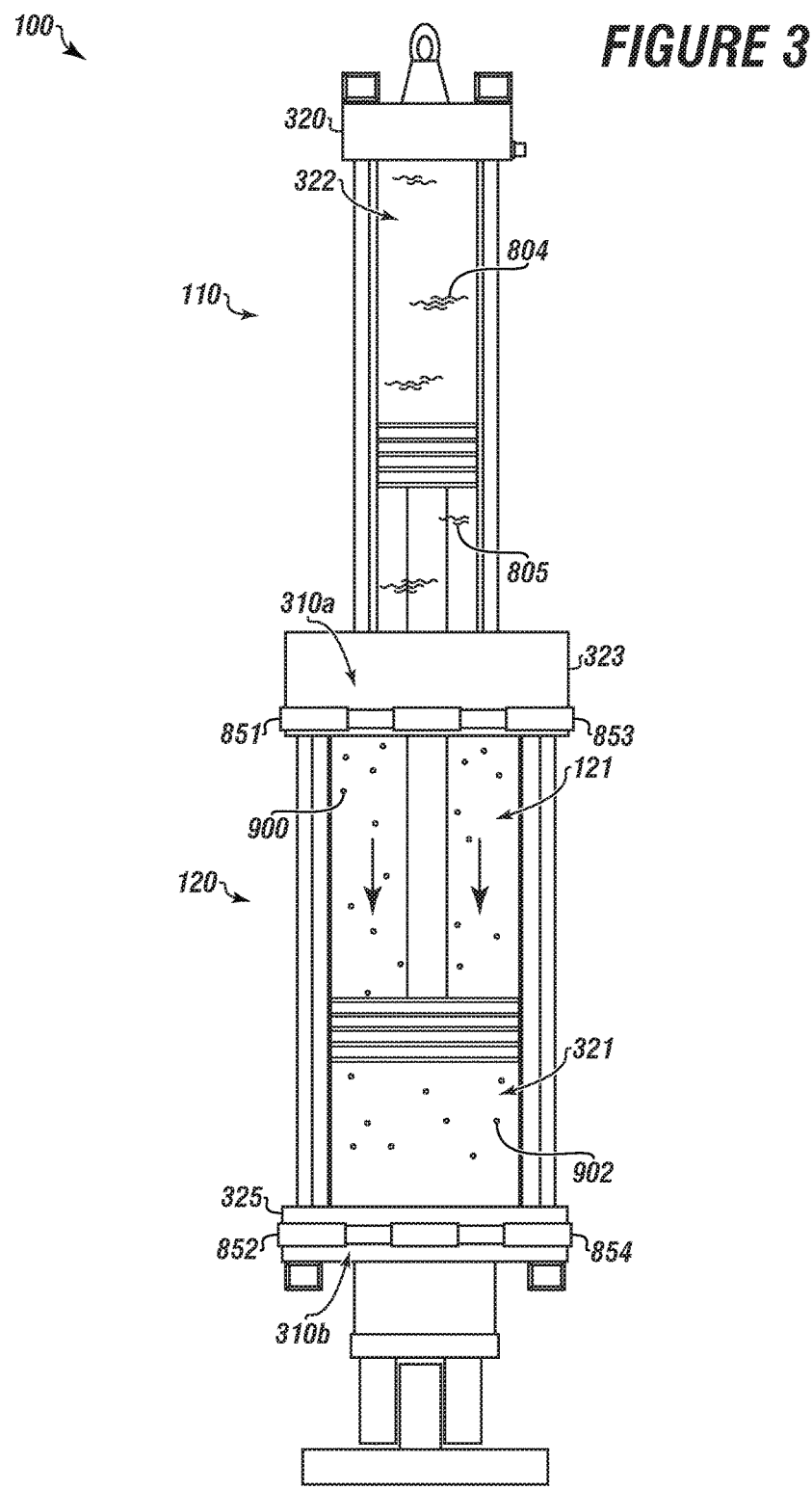
FIG. 3 depicts the gas compressor configured to have a high pressure chamber and low pressure chamber according to one or more embodiments.

FIG. 3 depicts the gas compressor 100 configured to have a high pressure chamber in the drive power section 322 and upper compression chamber 121 in the dual activating compressor section 120.

The gas compressor 100 can have a drive power section 110 for receiving a pressurized hydraulic drive fluid 804 and discharging the non-pressurized spent hydraulic drive fluid 805.

A hydraulic upper head 320 can be at one end of the drive power section 110.

The drive power section 110 can have a high pressure chamber 322 for pushing the hydraulic drive piston towards the common head 323.

The gas compressor 100 can be configured, wherein the dual activating compressor section 120 has a low pressure chamber 321 and a high pressure chamber 322.

The low pressure chamber 321 can support gas pressures from −20 inches of water vacuum to 500 psig. High pressure chamber can support gas pressures from 1 psig to 1000 psig.

In embodiments, the gas compressor can have a suction side and a discharge side to the compressor cylinder.

A first check valve 851 can be connected on an upper manifold 310a and located in the common head 323 for regulating the intake and discharge of source vapor or gas 900 in tandem with the third check valve 853 located on the discharge end of the upper manifold and also mounted to the common head.

The second check valve 852 and the fourth check valve 854 can be mounted on opposite sides of a lower manifold 310b and are operated in tandem. The second check valve, fourth check valve and lower manifold can be located on the compressor lower head 325. Compressed vapors 902 are shown in the low pressure chamber 321.

To operate the system, when the compressor piston is moving from a location adjacent the common head 323 towards the compressor lower head 325, the source vapor or gas 900 can be drawn into the upper compression chamber 121 through an open first check valve 851.

The pressure created in the lower compression chamber 123 can close the second check valve 852 and simultaneously open the fourth check valve 854.

The pressure relieved by the fourth check valve 854 can close the third check valve 853 through connections 425 between the upper manifold 310a and lower manifold 310b.

The connections between the upper manifold 310a and the lower manifold 310b can be pipes or hoses With this configuration, compressed gas discharged through the fourth check valve to a transmission line, tank or similar destination.

Figure 4:
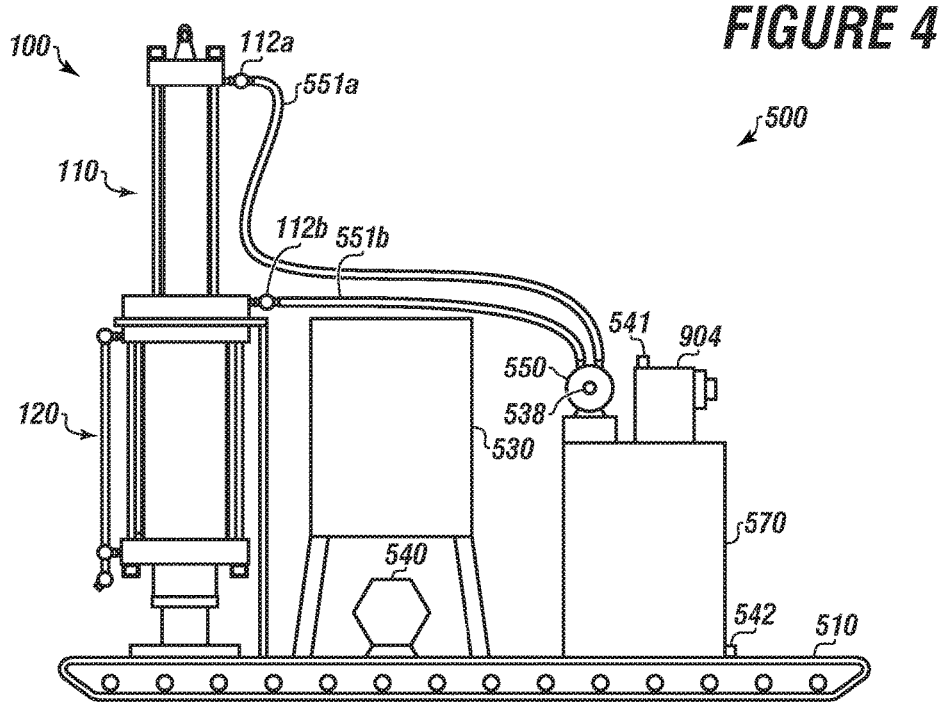
FIG. 4 depicts a schematic of a system utilizing the gas compressor according to one or more embodiments.

FIG. 4 depicts a schematic of a first portable hydraulic powered compressor system 500 utilizing the gas compressor 100.

The portable hydraulic powered compressor system 500 can have a skid 510. In embodiments, the skid can be made from steel.

The portable hydraulic powered compressor system 500 can include a gas compressor 100 installed on the skid 510. The gas compressor 100 can have a drive power section 110 connected to a dual activating compressor section 120. Each section can have a piston powered by and connected to a common rod.

In embodiments, the system can have a plurality of control valves 550 for regulating flow of the hydraulic fluid into the plurality of flow lines 551a-551b. The control valves are controlled by a controller 530 to provide fluid through the first drive port 112a and the second drive port 112b.

For example, if the compressor piston has reached a lower end of the upper compression chamber, a signal from a piston locator sensor can be sent to the controller and the controller can switch the control valves 550 to cause fluid to flow to the second flow line 551b to move the compressor piston up.

When the compressor piston has reached the top of the upper compression chamber, the controller can receive a signal from one of the piston locator sensors to switch the control valves 550 and provide fluid to the first flow line 551a to move the compressor piston down. The operation can be performed manually or automated using one or more sensors and one or more predetermined parameters stored in the controller.

The controller 530 can be a processor with data storage or a programmable logic circuit.

The controller 530 is further in communication with the compressor, hydraulic drive pump, prime mover 540, and all the sensors, and is used to automatically regulate hydraulic fluid flow into and out of the drive power section of the compressor as well as regulate flow of source vapor or gas into and out of a compressor section of the compressor all simultaneously.

A heat exchanger 904, controlled by a controller, is used to cool the spent hydraulic drive fluid.

An oil temperature sensor 541 is connected to the heat exchanger 904 and in communication with the controller 530.

An oil discharge pressure sensor 538 is connected to the control valves 550 and in communication with the controller 530.

A reservoir low liquid sensor 542 is connected to a fluid reservoir 570 to detect when the fluid in the reservoir has reached a level when pumping should stop. The reservoir low liquid sensor can be in communication with the controller 530.

Figure 5:
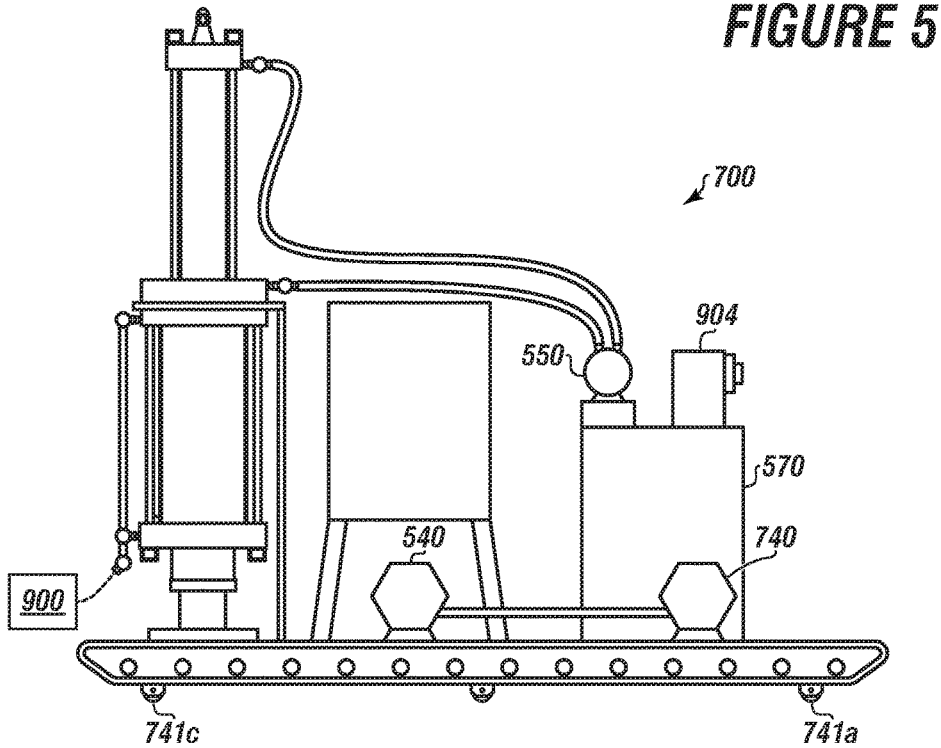
FIG. 5 depicts a schematic of a system having a hydraulic pumping unit driven by a hydraulic fluid system according to one or more embodiments.

FIG. 5 depicts a schematic of a second portable hydraulic powered compressor system 700 with a source vapor or gas 900.

The portable hydraulic powered compressor system 700 can include like parts to the first portable hydraulic powered compressor system 500, seen in FIG. 4, and for brevity those like parts will not be discussed. In the portable hydraulic powered compressor system 700 can be operatively connected with the fluid reservoir 570 via supply lines or flow lines.

The control valve 550 can be in communication with the fluid reservoir 570 and a hydraulic drive pump 740. In embodiments, the prime mover motor 540 can drive the hydraulic drive pump 740.

The hydraulic drive pump 740 can transfer fluid from the fluid reservoir 570 to the control valve and the upper hydraulic drive chamber.

The heat exchanger 904 can be mounted to the fluid reservoir 570 to cool spent hydraulic fluid.

Wheels 741a-741c can be mounted to the skid to enable greater portability of the system.

In operation fluid can be selectively provided to the first drive port or the second drive port to move the hydraulic drive piston up or down. The compressor piston will move in the same direction as the hydraulic drive piston. The compressor piston can compress gas in the upper compression chamber and force the gas out of one of the gas ports, and the compressor piston can simultaneously suction additional gas into the upper compression chamber via one or more gas ports. When the compressor piston is moved in the other direction the additional gas can be compressed and formed out of the upper compression chamber via one or more of the gas ports.

The gas compressor can also be used in conjunction with a rod pumping unit to lower back pressure in a casing. The gas compressor can be used to drive natural gas to other gas operated equipment, like a rod pumping unit or electric generators. Other uses for the gas compressor can include use as a vapor extraction unit to remove vapor from storage tank battery systems or methane capture systems in a land fill or similar systems. The gas compressor can be used to capture or compress vapor, gas, or combinations thereof from any source.

In embodiments, the wheels 741a-741c can be mounted to the skid to enable greater portability of the system.

Figure 6:
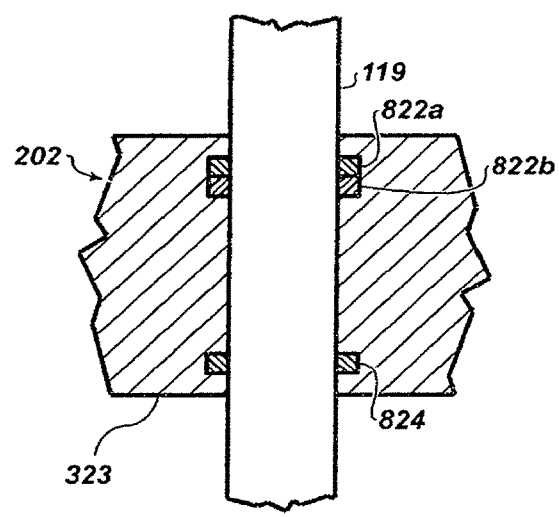
FIG. 6 depicts a detail of the seal assembly usable in an embodiment of the gas compressor according to one or more embodiments.

FIG. 6 depicts a detail of the seal assembly 202 usable in an embodiment of the gas compressor.

The common rod 119 is shown with an upper hydraulic seal 822a connected to a lower hydraulic seal 822b.

In embodiments, the hydraulic seals can be high temperatures self-lubricating positive pressure seals.

A compressor seal 824 is shown in a spaced apart relation to the upper and lower hydraulic seals 822a-822b. Upper hydraulic seal 822a can keep hydraulic fluid in the hydraulic drive cylinder.

The compressor seal 824 can keep the source vapor or gas in the compressor cylinder. The compressor seal can be the same type of seal as the upper and lower hydraulic seals. In embodiments, the seals are preferably non-corrosive.

Figure 7:
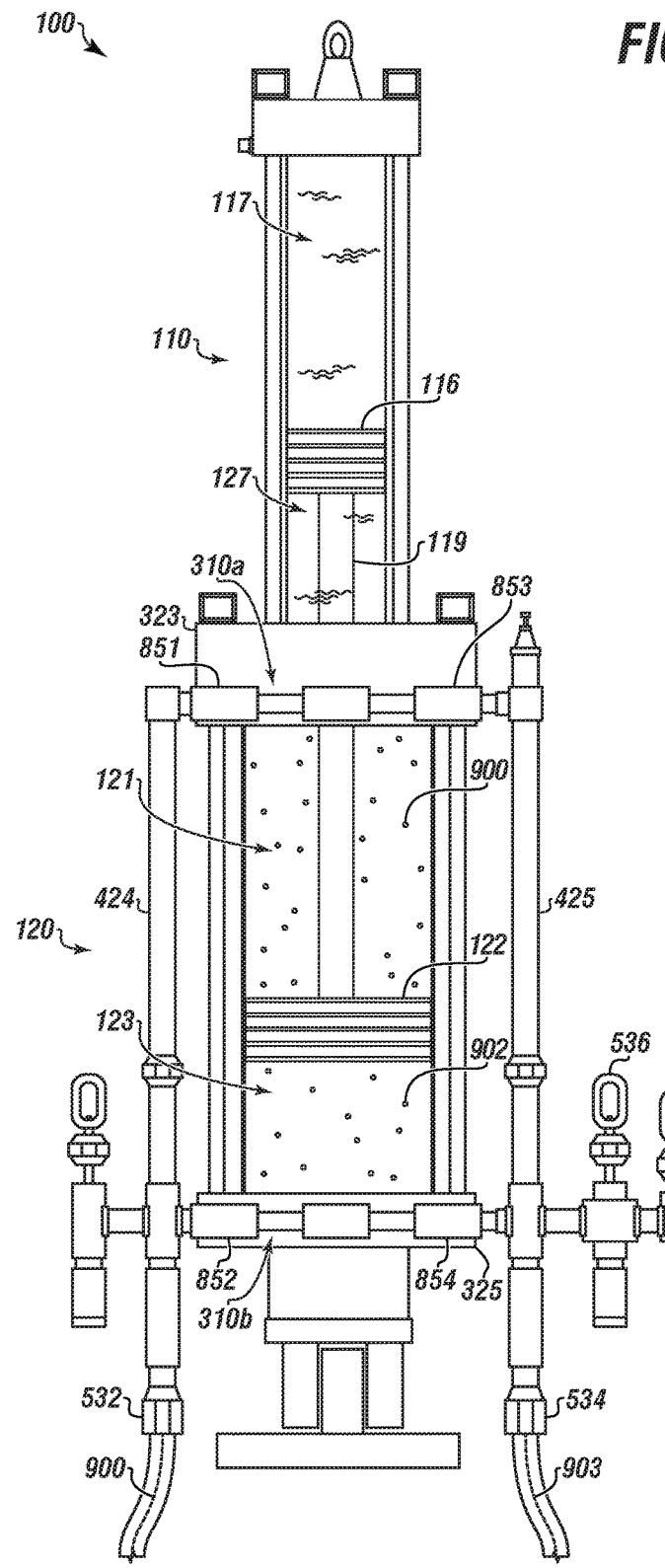
FIG. 7 depicts a gas compressor with four check valves depicted according to one or more embodiments.

FIG. 7 depicts the suction side and discharge side of the dual activating compressor section 120 in more detail.

In embodiments, the source vapor or gas 900 can enter the suction side of the dual activating compressor section 120. Discharge vapors 903, which can include compressed vapors 902, can be ejected from the discharge side of the dual activating compressor section.

The following dual pressurization occurs in operation when the compressor piston moves from a position adjacent the compressor lower head towards the common head, hence the term "dual action" and also in reverse as the compressor piston moves from a position adjacent the common head toward the compressor lower head.

Dual Action Compression Piston Moving Up Scenario

On the suction side, when the compressor piston 122 is moving up, from a location adjacent a lower manifold 310b, source vapor or gas 900 enters through a second check valve 852 into the lower manifold 310b and into a lower compression chamber 123.

Pressure is created in the upper compression chamber 121 by the compressor piston 122 as the compressor piston 122 moves toward the common head 323.

The increased pressure on the source vapor or gas 900 is transferred to the source vapor or gas 900 resident in the upper manifold 310a and the increased pressure in the upper manifold 310a on the source vapor or gas closes the first check valve 851 in the upper manifold 310a.

The increased pressure also travels through the upper manifold 310a through the third check valve 853 and passes through the discharge connecting conduit 425 to apply pressure to the fourth check valve 854 to close the fourth check valve 854, enabling compressed vapors 902 to discharge from the upper compression chamber 121 to line pressure as discharge vapors 903 that are pressurized.

Dual Action Compressor Piston Moving Down Scenario

The following dual pressurization occurs in operation when the compression piston moves from a position adjacent the common head toward the compressor lower head, hence the term "dual action".

When the compressor piston 122 moves from a location adjacent the common head 323 towards the compressor lower head 325, the source vapor or gas 900 is suctioned into the upper compression chamber 121 through the suction connecting conduit 424 and through the first check valve 851 into the upper compression chamber 121.

Simultaneously increasing pressure caused by the moving compressor piston 122 on compressed vapors 902 in the lower compression chamber 123 creates pressurized compressed vapors 902 that supply pressure through the fourth check valve 854 pressurizing compressed vapors in the discharge connecting conduit 425. The pressure on the compressed vapors in the discharge connecting conduit 425 causes the third check valve 853 to close.

Also, simultaneously increasing pressure caused by the moving compressor piston 122 in the lower compression chamber 123 supplies pressure to compressed vapors in the lower manifold 310b. The increasing pressure on the compressed vapors in the lower manifold causes the second check valve 852 to close.

The first check valve 851 operates in tandem with the fourth check valves 854 that is; both valves are simultaneously open when the second and third check valves 852 and 853 are closed.

In embodiments, each can be connected to the aforementioned controller. Sensors can include compressor discharge temperature sensor 536, a compressor discharge pressure sensor 534, and a vapor gas source pressure sensor 532, all of which can be in communication with the controller enabling the controller to compare signals from the sensors to stored parameters in the controller data storage and enable the processor of the controller to open or close valves as needed when signals fall below or exceed stored parameters.

In embodiments, the dual activating compressor section 120 can be made from high temperature materials allowing the gas compressor to be used in high temperature operations up to and including 500 degrees.

In embodiments, the gas compressor can have a nickel plating on the compressor piston, the common rod 119, the common head, and the compressor lower head.

In embodiments, the gas compressor can have at least one hydraulic drive cylinder and the compressor cylinder and can comprise fiberglass composite material.

In embodiments, the hydraulic drive cylinder, the compressor cylinder or both can be made from fiberglass composite material.

While these embodiments have been described with emphasis on the embodiments, it should be understood that within the scope of the appended claims, the embodiments might be practiced other than as specifically described herein.

What is claimed is:

1. A gas compressor comprising:
    a. a drive power section for receiving a pressurized hydraulic drive fluid and discharging a non-pressurized spent hydraulic drive fluid with a hydraulic drive cylinder having a hydraulic drive cylinder stroke Y;
    b. a one-piece common rod connecting to a hydraulic drive piston of the drive power section;
    c. a dual activating compressor section connected to a common head, the dual activating compressor section configured for receiving a source of vapor or gas and providing a gas discharge, the dual activating compressor section comprising:
        (i) a compressor cylinder having a compressor cylinder stroke X identical to the hydraulic drive cylinder stroke Y, the compressor cylinder comprising:
            1. an upper compression chamber; and
            2. a lower compression chamber separated from the upper compression chamber by a compressor piston connected to the one-piece common rod through the seal assembly;
        (ii) a first piston locator sensor positioned adjacent the compressor cylinder for detection of the compressor piston at a first end of a stroke; and
        (iii) a second piston locator sensor positioned adjacent the compressor cylinder, for detection of the compressor piston at a second end of the stroke;
    d. a one-piece common head receiving the one-piece common rod, wherein a center section of the one-piece common head is a seal assembly separating the drive power section from the dual activating compressor, the one-piece common head joining the drive power section with the dual activating compressor, the seal assembly consisting of:
        a compressor seal consisting of a single ring positioned closest to the compressor cylinder;
        an upper hydraulic seal consisting of a single ring positioned closest to the hydraulic drive cylinder; and
        a lower hydraulic seal consisting of a single ring connected to the upper hydraulic seal; and
        wherein the compressor seal is in a first groove in the one piece common head and in a spaced apart relation to both the upper hydraulic seal and lower hydraulic seal which are both in a second groove in the one piece common housing and without being between the upper and lower hydraulic seals, the compressor seal preventing gas from exiting the compressor, the hydraulic seals preventing pressurized hydraulic drive fluid and non-pressurized spent hydraulic drive fluid from exiting the hydraulic drive cylinder while separating the hydraulic drive cylinder from the compressor cylinder and sealing the one-piece common rod;
    e. a controller configured to receive signals from the first piston locator sensor and the second piston locator sensor and repeatedly reverse direction of pressurized hydraulic fluid flow through hydraulic flow lines connecting a fluid reservoir to the hydraulic drive cylinder;
    f. a hydraulic drive pump that can pressurize and transfer the hydraulic drive fluid from the fluid reservoir to the drive cylinder;
        wherein the compressor piston moves between a first orientation and a second orientation; as the compressor piston moves, the first piston locator sensor transmits a signal to the controller causing entry of the pressurized hydraulic drive fluid into the hydraulic drive cylinder while simultaneously causing discharge of spent hydraulic fluid from the hydraulic drive cylinder moving the compressor piston towards the second piston locator sensor while simultaneously drawing the vapor or gas into the upper compression chamber and discharging compressed vapors at a line pressure from the lower compression chamber, the second piston locator sensor detects the compressor piston, and the controller upon receipt of the second signal and reverses the pressurized hydraulic drive fluid flow, the gas compressor causes the hydraulic drive piston and the compressor piston to move in tandem using the one-piece common rod for recovery of at least one of the vapors and gas.

2. The gas compressor of claim 1, wherein the drive power section comprises:
    a. an upper hydraulic drive chamber; and
    b. a lower hydraulic drive chamber with the hydraulic drive piston movably positioned between the upper hydraulic drive chamber and the lower hydraulic drive chamber, and wherein the upper hydraulic drive chamber is adapted to receive the pressurized hydraulic drive fluid while the lower hydraulic drive chamber simultaneously discharges the non-pressurized spent hydraulic drive fluid.

3. The gas compressor of claim 2, comprising a first drive port in fluid communication with the upper hydraulic drive chamber and a second drive port in fluid communication with the lower hydraulic drive chamber, wherein the first drive port is configured to sequentially receive and exhaust the pressurized hydraulic drive fluid and the second drive port is configured to sequentially receive the pressurized hydraulic drive fluid and exhaust the non-pressurized spent hydraulic drive fluid.

4. The gas compressor of claim 1, the dual acting compressor section comprising:
    a. a compressor lower head;
    b. an upper manifold installed in the one-piece common head;
    c. a lower manifold installed in the compressor lower head;
    d. a first check valve installed on one end of the upper manifold;
    e. a second check valve installed on a first end of the lower manifold;
    f. a third check valve installed on an opposite end of the upper manifold; and
    g. a fourth check valve installed on an opposite end of the lower manifold and in operation with the movement of the compressor piston in a first direction causing the second check valve and the third check valve to open the first check valve and fourth check valve to close discharging the vapor or gas through the third check valve, and wherein movement of the compression piston in a second direction causes the first check valve and the fourth check valve to open and the second check valve and the third check valve to close discharging the compressed vapors through the fourth check valve.

5. The gas compressor of claim 1, wherein when the compressor piston moves from a location adjacent the compressor lower head towards the one-piece common head, the vapor or gas enters the lower manifold through the second check valve into the lower compression chamber, wherein as pressure is created in the upper compression chamber by the compressor piston as the compressor piston moves toward the one-piece common head, increased pressure on the vapor or gas is transferred to the vapor or gas resident in the upper manifold and the increased pressure in the upper manifold on the vapor or gas closes the first check valve as increased pressure simultaneously travels through the upper manifold through the third check valve and passes through a discharge connecting conduit to apply pressure to the fourth check valve to close the fourth check valve, enabling the compressed vapors to discharge from the upper compression chamber to line pressure and when the compressor piston moves from a location adjacent the one-piece common head towards the compressor lower head, the vapor or gas is suctioned into the upper compression chamber through a suction connecting conduit and through the first check valve into the upper compression chamber while simultaneously increasing pressure caused by moving the compressor piston on the compressed vapors in the lower compression chamber creating pressurized compressed vapors that supply pressure through the fourth check valve pressurizing the compressed vapors in the discharge connecting conduit, and wherein the pressure on the compressed vapors in the discharge connecting conduit causes the third check valve and the second check valve to close and simultaneously, the increase pressure caused by the moving compressor piston in the lower compression chamber supplying pressure to the compressed vapors in the lower manifold enabling discharge of the compressed vapors through the fourth check valve.

6. The gas compressor of claim 1, comprising a plurality of tie rods in parallel and disposed around the compressor cylinder and connected between the compressor lower head and the one-piece common head.

7. The gas compressor of claim 1, comprising a plurality of tie rods connected in parallel and disposed around the hydraulic drive cylinder and connected between the hydraulic upper head and the one-piece common head.

8. The gas compressor of claim 1, wherein the compressor cylinder and the hydraulic drive cylinder are adjustable to volumes of gas, line pressure, strokes per minute and source pressure.

9. The gas compressor of claim 1, comprising a plurality of bidirectional compressor ports with a first bidirectional compressor port configured to sequentially receive the vapor or gas and exhaust the pressurized vapor or gas and a second bidirectional compressor port configured to sequentially receive the vapor or gas and exhaust the compressed vapors.

10. The gas compressor of claim 1, comprising a low pressure chamber and a high pressure chamber in the dual activating compressor section.

11. The gas compressor of claim 1, comprising a heat exchanger for cooling the hydraulic drive fluid, and wherein the heat exchanger is fluidly connected to the fluid reservoir.

12. The gas compressor of claim 1, comprising a prime mover motor connected to a hydraulic drive pump for providing the pressurized hydraulic fluid from the fluid reservoir to the hydraulic drive cylinder.

13. The gas compressor of claim 1, comprising at least one further sensor connected to the controller, the at least one further sensor including least one of: a vapor pressure sensor, a compressor discharge pressure sensor, a compressor discharge temperature sensor, a hydraulic oil discharge pressure sensor, a hydraulic oil temperature sensor, and a hydraulic oil reservoir low liquid level sensor.

14. The gas compressor of claim 1, wherein the dual activating compressor section comprises high temperature materials allowing the gas compressor to be used in high temperature operations up to and including 500 degrees Fahrenheit.

15. The gas compressor of claim 1, wherein at least one of: the compressor piston, the one-piece common rod, the one-piece common head, and the compressor lower head comprise a nickel plating.

16. The gas compressor of claim 1, wherein at least one of: the hydraulic drive cylinder and the compressor cylinder comprise fiberglass composite material.

* * * * *